United States Patent
Oohashi et al.

(10) Patent No.: US 8,579,064 B2
(45) Date of Patent: Nov. 12, 2013

(54) VEHICLE WITH ELECTRIC EQUIPMENT

(75) Inventors: Satoshi Oohashi, Iwata (JP); Hitoshi Hasegawa, Iwata (JP); Nobuhiko Maehashi, Iwata (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 320 days.

(21) Appl. No.: 12/461,342

(22) Filed: Aug. 7, 2009

(65) Prior Publication Data

US 2010/0032225 A1 Feb. 11, 2010

(30) Foreign Application Priority Data

Aug. 8, 2008 (JP) ................................. 2008-206327

(51) Int. Cl.
*B62K 11/00* (2013.01)

(52) U.S. Cl.
USPC .......................................... 180/219; 180/309

(58) Field of Classification Search
USPC ........................................ 180/219, 309, 68.4
See application file for complete search history.

(56) References Cited

U.S. PATENT DOCUMENTS

| 4,524,843 A * | 6/1985 | Class et al. ..................... 180/179 |
| 5,992,554 A * | 11/1999 | Hasumi et al. ................. 180/229 |
| 6,672,918 B2 * | 1/2004 | Mashiko et al. ............. 440/88 A |
| 7,044,253 B2 * | 5/2006 | Takenaka et al. ............. 180/219 |
| 7,117,966 B2 * | 10/2006 | Kohda et al. .................. 180/68.5 |
| 2001/0045312 A1 * | 11/2001 | Adachi et al. .................. 180/219 |
| 2006/0220340 A1 * | 10/2006 | Seki et al. ...................... 280/272 |
| 2007/0089923 A1 * | 4/2007 | Oohashi et al. ............... 180/229 |
| 2007/0102224 A1 * | 5/2007 | Harada .......................... 180/309 |
| 2007/0107967 A1 * | 5/2007 | Satake .......................... 180/218 |
| 2007/0221169 A1 * | 9/2007 | Konno .......................... 123/400 |
| 2010/0018488 A1 * | 1/2010 | Arnold et al. ............. 123/169 R |

FOREIGN PATENT DOCUMENTS

| JP | 04-358983 A | 12/1992 |
| JP | 05-310159 A | 11/1993 |
| JP | 10-218057 A | 8/1998 |
| JP | 2002-166872 A | 6/2002 |
| JP | 2003-226281 A | 8/2003 |
| JP | 2007-253685 A | 10/2007 |

\* cited by examiner

*Primary Examiner* — Tony H. Winner
*Assistant Examiner* — Jacob Knutson
(74) *Attorney, Agent, or Firm* — Rabin & Berdo, P.C.

(57) ABSTRACT

A vehicle, such as a motorcycle, can include an engine and a head pipe provided ahead of the engine. Electrical equipment provided behind the head pipe and ahead of the engine can be partly exposed by a gap between a down frame and a radiator of the vehicle, enabling the electrical equipment to be cooled by airflow.

15 Claims, 14 Drawing Sheets

VEHICLE WITH ELECTRIC EQUIPMENT

CROSS-REFERENCE TO RELATED APPLICATIONS

This application claims priority under 35 U.S.C. §119 from Japanese Patent Application No. 2008-206327, filed Aug. 8, 2008, the entirety of which is incorporated herein by reference.

BACKGROUND OF THE INVENTION

1. Field of the Present Invention

Embodiments of the present invention relate generally to a vehicle. The vehicle can be a "saddle-type" vehicle, such as a motorcycle. More specifically, embodiments of the invention relate to a motorcycle including electric equipment with low compensation temperature.

2. Description of the Background Art

JP 2007-253685 A discloses an electric equipment support structure for a motorcycle. According to the disclosed support structure, in order to simplify an attachment structure for a capacitor that is sensitive to vibration and heat, in an engine having an upright cylinder, a throttle body is connected to the intake path of the cylinder through an insulator, and the throttle body is connected to an air cleaner through a connecting tube. In this way, the throttle body is elastically supported with respect to the engine and the body frame through the insulator and the connecting tube. The capacitor is provided under the throttle body and the capacitor is held together with the throttle body by the lower portion of a throttle body cover. The capacitor is provided with a vibration-proof support structure using the elastically supported throttle body.

SUMMARY OF THE INVENTION

Embodiments of the invention relate to a vehicle having electric equipment arranged so that the equipment can be sufficiently cooled. The vehicle can be, for example, a saddle-type vehicle such as a motorcycle.

A vehicle according to embodiments can include a head pipe, an engine, an intake pipe, an exhaust pipe, and electric equipment. The engine can be provided behind the head pipe. The intake pipe can be connected to the front side of the engine and provided ahead of the engine. The exhaust pipe can be connected to the back side of the engine and provided behind the engine. The electric equipment can be provided behind the head pipe and ahead of the engine.

The electric equipment can include, for example, an atmospheric pressure sensor to detect atmospheric pressure, a temperature sensor to detect temperature of coolant (e.g., cooling water), a rectifier-regulator arranged to regulate and rectify voltage supplied from a generator at a prescribed level, an ignition coil to supply high voltage to an ignition plug, a capacitor to smooth output voltage from the rectifier-regulator, a joint connector to branch a plurality of wirings included in a harness, and a connector to receive externally supplied electric power.

Advantageously, because the electric equipment can be provided behind the head pipe and ahead of the engine as described above, traveling airflow can be directed at and reach the electric equipment. In this way, the electric equipment can be sufficiently cooled.

In light of the foregoing, embodiments of the invention further relate to a vehicle that can comprise a down frame, a left radiator and a right radiator, and a plurality of electrical components. In a front view of the vehicle, at least a portion of the electrical components can be exposed in a gap between at least one of the left radiator and the right radiator and the down frame.

Embodiments of the invention still further relate to a motorcycle that can comprise a frame, an engine mounted to the frame, a head pipe, and electrical equipment mounted to the frame between the head pipe and the engine so as to be at least partly exposed in a front view of the motorcycle.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
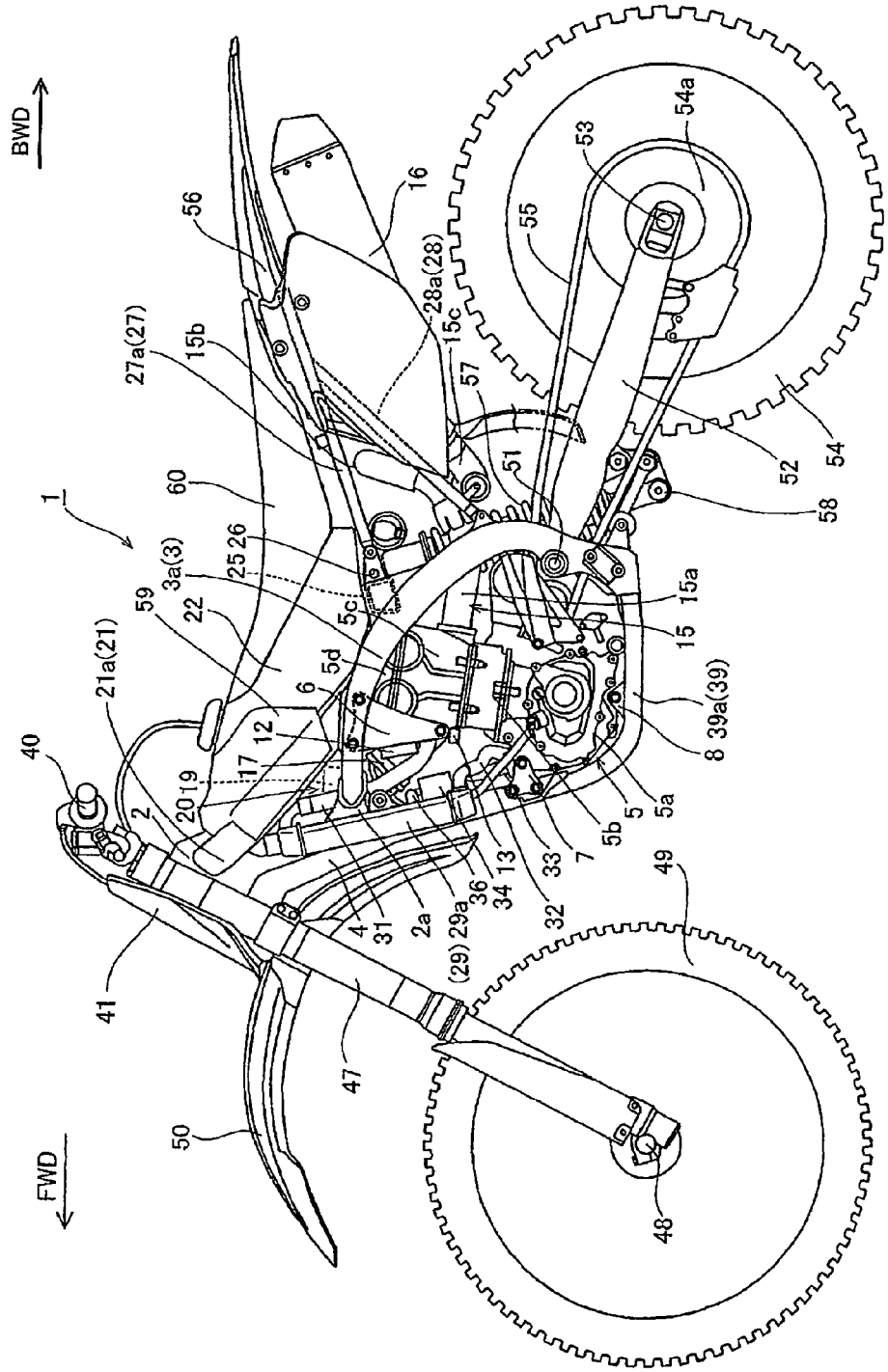
FIG. 1 is a right side view of a general structure of a motorcycle according to embodiments of the invention.

The invention will now be described in more detail by way of example with reference to the embodiments shown in the accompanying Figures. It should be kept in mind that the following described embodiments are only presented by way of example and should not be construed as limiting the inventive concept to any particular physical configuration. It should further be understood that "exemplary" as used herein means "serving as an example, instance or illustration." Any aspect referred to herein as "exemplary" is not necessarily to be construed as preferred over other aspects.

Further, if used and unless otherwise stated, the terms "upper," "lower," "front," "back," "over," "under," and similar such terms are not to be construed as limiting the invention to a particular orientation. Instead, these terms are used only on a relative basis.

Moreover, any term of degree used herein, such as "substantially," "essentially," "nearly" and "approximately" means a reasonable amount of deviation of the modified word is contemplated such that the end result is not significantly changed. For example, such terms can be construed as allowing a deviation of at least 5% of the modified word if this deviation would not negate the meaning of the word the term of degree modifies.

Additionally, the following description includes references to directions, such as "front," "ahead," "back," "rear," "behind," "right," "left," "upward," "downward," "forward," "backward," "widthwise," "lengthwise," "horizontal" and "vertical." As used herein, these terms reflect the perspective of a person facing in the direction indicated by the arrow labeled "FWD" in the drawings, such as a rider seated on or straddling the motorcycle 1 and facing toward the front wheel 49. Thus, the arrow labeled "FWD" indicates a back-to-front direction relative to the motorcycle 1, or an advancing direction of the motorcycle 1. Moreover, the arrow labeled "BWD" indicates a front-to-back direction relative to the motorcycle 1. A direction specified as "left" or "right" in the description refers to left or right with respect to the FWD direction or BWD direction. "Widthwise" corresponds to a direction substantially transverse to the FWD or BWD directions. "Lengthwise" (with respect to the motorcycle 1) corresponds substantially the FWD or BWD directions. "Vertical" refers to a direction substantially transverse to both the widthwise and lengthwise directions, and corresponds substantially to "upward" and/or "downward." "Horizontal" refers to a direction substantially transverse to the vertical direction.

The following describes exemplary embodiments of the present invention with reference to the accompanying drawings. As previously described, the embodiments relate to a vehicle, such as a motorcycle, and may more particularly relate to an off-road-type motorcycle. However, embodiments of the invention are not limited to a particular type of vehicle or motorcycle. For example, embodiments of the invention can be implemented in an on-road-type motorcycle, such as a motor scooter, or in other types of vehicles such as an ATV (All Terrain Vehicle).

General Structure of Motorcycle

FIG. 1 is a left side view of a motorcycle 1 according to embodiments of the invention. As shown in FIG. 1, the motorcycle 1 can be, for example, an off-road-type vehicle. The motorcycle 1 can include a head pipe 2, a pair of main frames 3 comprising a left main frame 3a and a right main frame 3b (see FIG. 3), a down frame 4, a pair of under frames 39 comprising a left under frame 39a and a right under frame 39b (see FIG. 3), an engine 5 (e.g., a water-cooled single-cylinder DOHC (Double Over Head Camshaft)), and a pair of radiators 29 comprising a left radiator 29a and a right radiator 29b (see FIG. 4). The motorcycle 1 can further include an air cleaner 59, a throttle body 17, a funnel 19, an intake pipe 20, an exhaust pipe 15, a muffler 16, a handle 40, a cover or number plate 41, a front fork 47, a front wheel 49, a front fender 50, a rear arm 52, a rear wheel 54, a chain 55, a rear fender 56, a rear suspension 57, a pair of tank frames 21 comprising a left tank frame 21a and a right tank frame 21b (see FIG. 3), a fuel tank 22, a seat 60, a pair of seat frames 27 comprising a left seat frame 27a and a right seat frame (not shown), and a pair of backstays 28 comprising a left backstay 28a and a right backstay (not shown).

The main frames 3a, 3b can be connected to a connection portion 2a. The connection portion 2a can be formed to extend downward and slightly backward from the head pipe 2. The main frames 3a, 3b can be formed to extend backward and slightly downward from the connection portion 2a. The down frame 4 can extend downward and slightly backward from the head pipe 2. The under frames 39a, 39b can extend substantially horizontally from the down frame 4.

The handle 40 can be rotatably supported by the head pipe 2. The number plate 41 can be provided to cover the front of the head pipe 2. The front fork 47 can be provided under the head pipe 2. An axle 48 can be fixed to the lower end of the front fork 47. The front wheel 49 can be rotatably provided at the axle 48. The front fender 50 can be provided above the front wheel 49 to cover the front wheel 49.

A pivot shaft 51 can be provided at the back of the main frames 3a, 3b. The rear arm 52 can be supported at its front end so that it can swing around the pivot shaft 51 in a substantially or approximately vertical direction. An axle 53 can be fixed to the rear end of the rear arm 52. The rear wheel 54 can be rotatably attached to the axle 53. The rear wheel 54 can have a driven sprocket 54a that rotates together with the rear wheel 54. The driven sprocket 54a can have the chain 55 engaged therewith. The chain 55 can be driven by the engine 5. The driven sprocket 54a and the chain 55 can be provided on the left side with respect to the forward direction (FWD). The rear fender 56 can be provided above the rear wheel 54.

The rear suspension 57 can be provided between the engine 5 and the rear wheel 54 and can be compressed and expanded. The upper end of the rear suspension 57 can be swingably attached to a support 26 of a connection member 25 for the main frames 3(a), 3(b). The lower end of the rear suspension 57 can be coupled to the rear arm 52 through a coupling mechanism 58. In this way, the rear suspension 57 can absorb impact on the rear arm 52 and the rear wheel 54.

Figure 2:
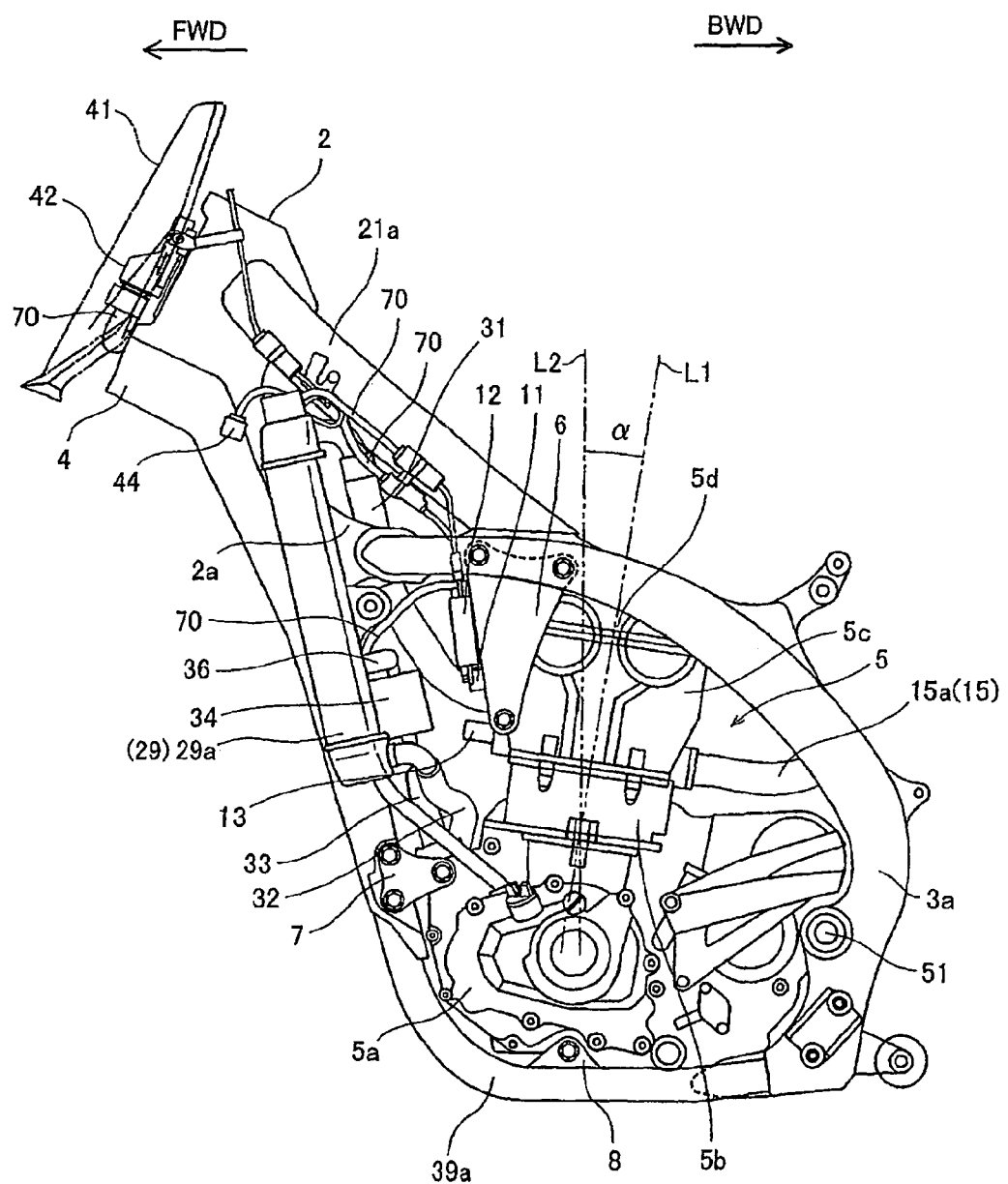
FIG. 2 is an enlarged right side view of an engine of the motorcycle, and associated peripheral structures of the engine.
Figure 3:
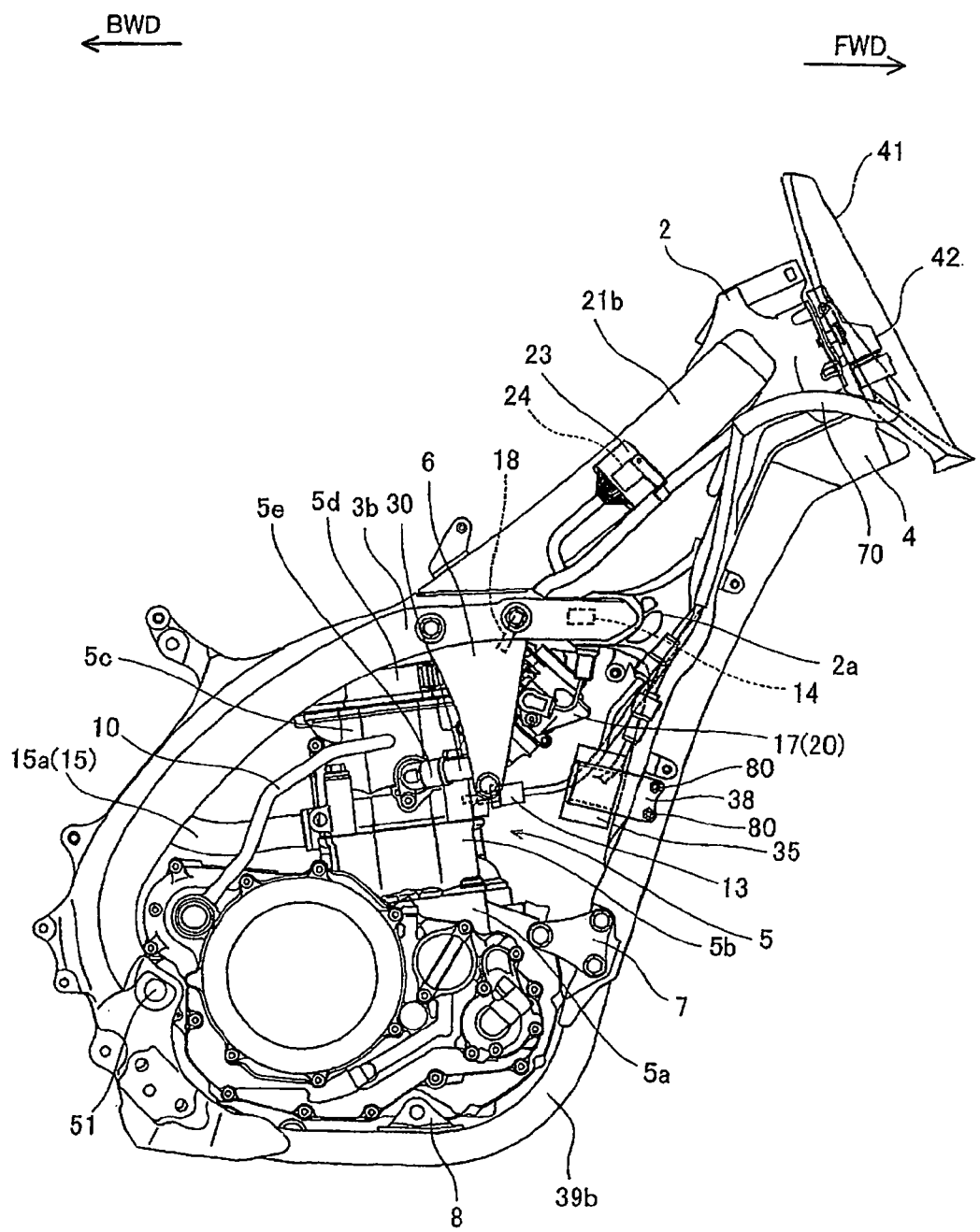
FIG. 3 is a left side view of the structures shown in FIG. 2.
Figure 4:
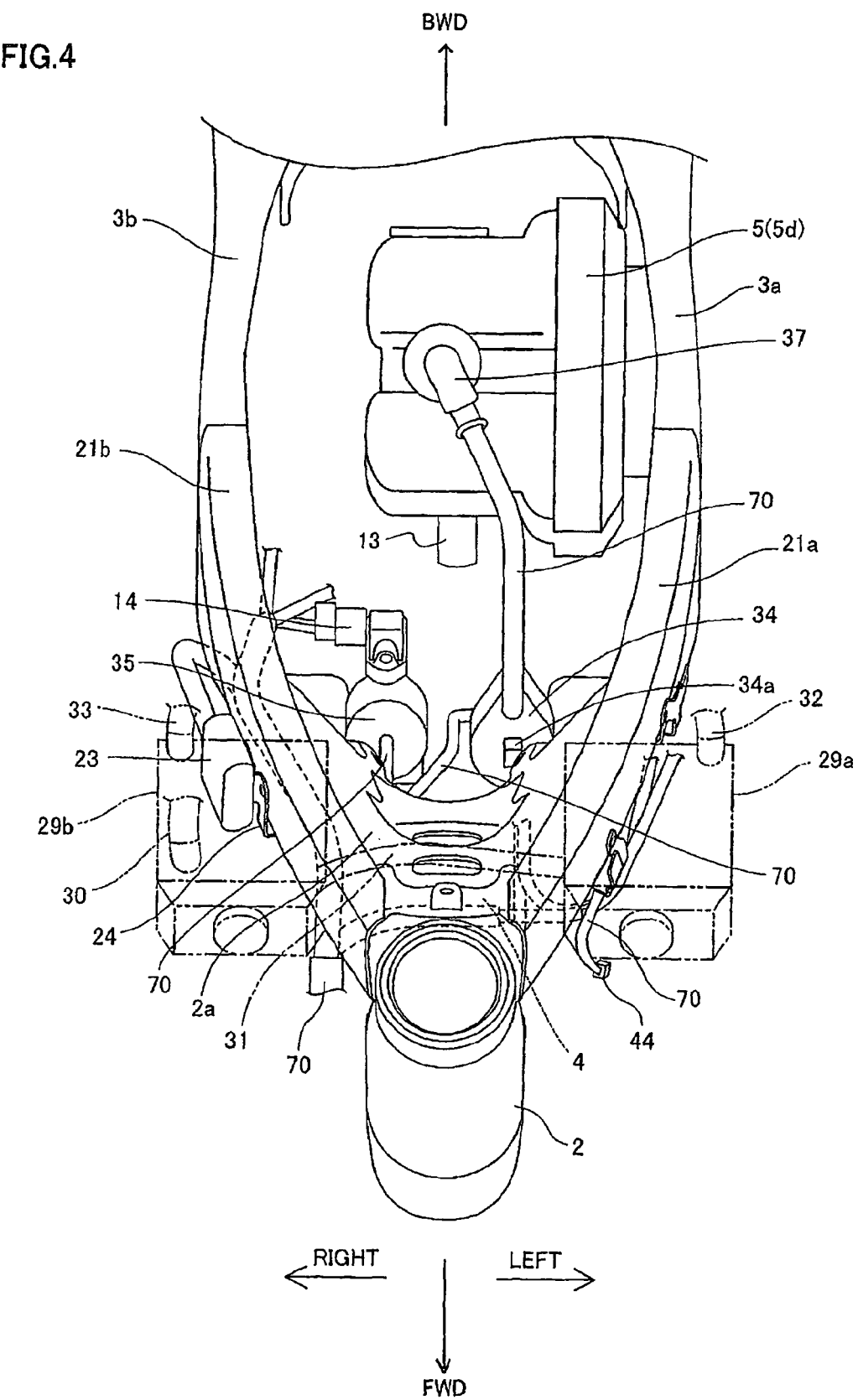
FIG. 4 is an enlarged plan view with the engine removed, showing a fuel tank and an air cleaner of the motorcycle, and associated peripheral structures.

FIG. 2 shows a side (the left side with respect to the forward direction (FWD)) of the engine 5 and associated peripheral structures. FIG. 3 shows the opposite side to the side shown in FIG. 2 (the right side with respect to the forward direction (FWD)). FIG. 4 shows the engine 5 and associated peripheral structures, with the fuel tank 22 and the air cleaner 59 removed. Referring to FIGS. 2 to 4, as noted previously the main frame pair 3 can include left and right main frames 3a and 3b, and the under frame pair 39 can include left and right under frames 39a and 39b. As shown in FIG. 2, the left under frame 39a can be connected to the left main frame 3a. As shown in FIG. 3, the right under frame 39b can be connected to the right main frame 3b.

As described previously, the tank frame pair 21 can include left and right tank frames 21a and 21b. The left tank frame 21a can be connected between the head pipe 2 and the left main frame 3a as shown in FIG. 2. The right tank frame 21b can be connected between the head pipe 2 and the right main frame 3b as shown in FIG. 3. The fuel tank 22 shown in FIG. 1 can be made, for example, of resin, and be placed on the tank frame pair 21 (21a and 21b).

As shown in FIG. 1, the air cleaner 59 can be provided ahead of and above the engine 5. More specifically, the air cleaner 59 can be provided between the head pipe 2 and the fuel tank 22, and between the left and right tank frames 21a and 21b. The air cleaner 59 can be protected by the number plate 41 from road debris such as water or pebbles. The fuel tank 22 can be provided so that its front at least partly covers the back of the air cleaner 59.

The throttle body 17 can be provided in front of the engine 5. The funnel 19 can be made, for example, of resin, and be provided under the air cleaner 59. The funnel 19 can be connected to the upstream side of the throttle body 17. The air cleaner 59 can take in air from the front and supply the air to the funnel 19. The funnel 19 can supply the air passed through the air cleaner 59 to the engine 5.

As described previously, the seat frame pair 27 shown in FIG. 1 can include a left seat frame 27a and a right seat frame (not shown). The backstays 28 can include a left backstay 28a and a right backstay (not shown). The left backstay 28a can be connected between the left seat frame 27a and the left main frame 3a. The right backstay can be connected between the right seat frame and the right main frame 3b Referring back to FIG. 1, the left main frame 3a and the right main frame 3b can be coupled by the connection member 25. The connection member 25 can include an integrally formed support 26. The seat frame 27 can be connected to the support 26 and extend backward and slightly upward from the support 26. The seat 60 can be provided on the upper portion of the seat frame 27. The front portion of the seat 60 can extend forward to cover at least a portion of the fuel tank 22. The rear portion of the seat 60 can extend backward to cover at least a portion of the rear fender 56.

The engine 5 can be provided under the pair of main frames 3. The engine 5 can be supported by plate-type support members 6, 7, and 8. As shown in FIG. 1, a left support member 6 can be fixed or attached to an upper part of the left main frame 3a to support the engine 5. A left support member 7 can be fixed or attached to the down frame 4 to support the engine 5. A left support member 8 can be fixed or attached to the left under frame 39a to support the engine 5. FIG. 4 shows right support plates 6, 7 and 8 and their corresponding attachments to the right main frame 3b, down frame 4 and right under frame 39b, respectively. Thus, the engine 5 can be mounted to the pair of main frames 3, the down frame 4, and the pair of under frames 39, respectively, by plate-type support members 6, 7, and 8.

Referring to FIGS. 1-3, the engine 5 can include a crankcase 5a, a cylinder block 5b, a cylinder head 5c, and a cylinder head cover 5d. The crankcase 5a can include a crankshaft (not shown). The cylinder block 5b can be provided on the crankcase 5a and include a piston (not shown). The cylinder head 5c can be provided on the cylinder block 5b and include two camshafts (not shown). The cylinder head cover 5d can be attached to cover the cylinder head 5c.

As shown in FIG. 2, the engine 5 can be provided so that a cylinder axis L1 of the cylinder block 5b is inclined backward from a substantially vertical direction L2. The inclination angle $\alpha$ can be, for example, about 5 degrees. As is known, the cylinder block 5b and cylinder head 5c can be comparatively heavy components, positioned near the center of gravity of the motorcycle 1. Advantageously, in the example illustrated in FIG. 2, a larger space can be created behind the head pipe 2 and ahead of the engine 5, as compared with a motorcycle having an engine aligned vertically.

Referring back to FIG. 1, the exhaust pipe 15 can be connected to the back side of the engine 5 and provided behind the engine 5. The exhaust pipe 15 can include a front stage portion 15a, a spiral-shaped portion 15b, and a back stage portion 15c. The front stage portion 15a can extend backward and slightly downward from the engine 5. The spiral-shaped portion 15b can extend from the front stage portion 15a and loop around once, for example. The back stage portion 15c can extend backward and upward from the spiral-shaped portion 15b. The exhaust pipe 15 can be connected to a muffler 16.

The intake pipe 20 can be connected to the front side of the engine 5 and provided in front of the engine 5, and comprise the throttle body 17 and funnel 19. As shown in FIG. 3, the throttle body 17 can be provided in front of the engine 5, and extend forward and upward. An electronic control fuel injector 18 that supplies fuel (e.g., gasoline) to the engine 5 can be attached to the upper portion of the throttle body 17.

As shown in FIG. 4, the radiator pair 29 can include left and right radiators 29a and 29b. The left radiator 29a can be attached on the left side (LEFT) of the down frame 4. The right radiator 29b can be attached on the right side (RIGHT) of the down frame 4. As shown in FIG. 1, the radiator 29 can be provided along the down frame 4. Traveling airflow can pass from the front to the back through the radiator 29. This allows heat from coolant circulating inside the radiator 29 to be discharged into the air.

Figure 5:
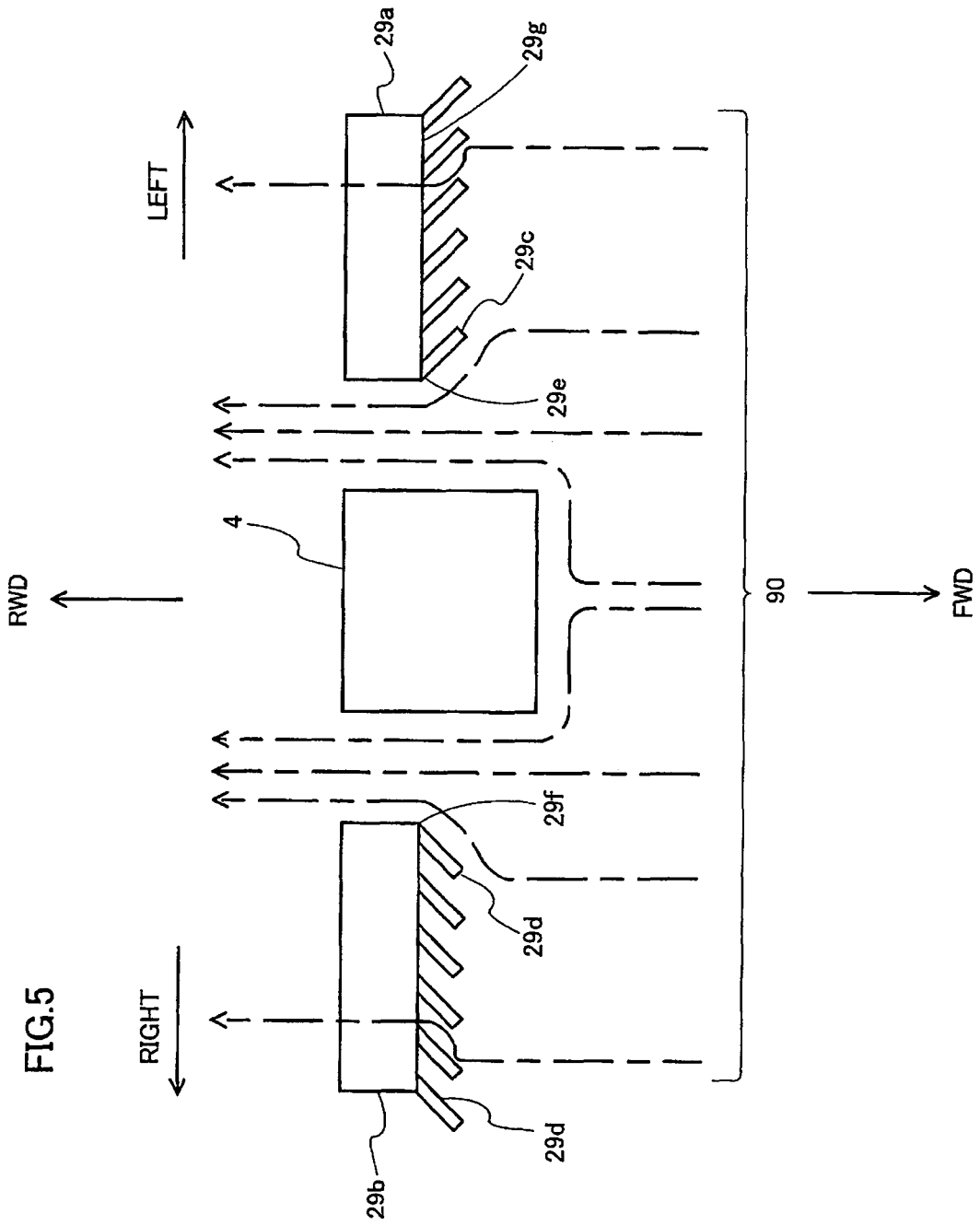
FIG. 5 is a plan view of a radiator and a down frame of the motorcycle.

FIG. 5 is a top view of the radiators 29a and 29b and the down frame 4. Referring to FIG. 5, a left mudguard 29c can be provided on the front surface of the left radiator 29a and a right mudguard 29d can be provided on the front surface of the right radiator 29b. The left mudguard 29c can extend obliquely to the left (LEFT) with respect to the front surface 29g of the left radiator 29a, from the vicinity of the inner side edge 29e of the left radiator 29a. The right mudguard 29d can extend obliquely to the right (RIGHT) with respect to the front surface 29h of the right radiator 29b from the vicinity of the inner side edge 29f of the right radiator 29b.

The mudguards 29c and 29d can each have, for example, a rectangular shape, elongated in a substantially vertical direction. A plurality of mudguards 29c and 29d can be provided, and be aligned in the widthwise direction (RIGHT, LEFT) of the motorcycle. When the radiators 29a and 29b are viewed from the front (FWD), the front surfaces 29g and 29h of the radiators 29a and 29b can be at least partly covered by the mudguards 29c and 29d. The mudguards 29c and 29d can prevent mud or the like, splashed up by the front wheel 49, from sticking to the front surfaces 29g and 29h of the radiators 29a and 29b. Moreover, an airflow 90, for example generated by forward travel of the motorcycle 1, can blow into the radiators 29a and 29b along the mudguards 29c and 29d, or be channeled into a gap between the down frame 4 and the radiators 29a and 29b and blow to the back.

Referring back to FIG. 3, a coolant outlet 5e can be provided on the right side of the engine 5. The coolant outlet 5e can be connected with a relay radiator hose 31 (see FIG. 1 and FIG. 4). As shown in FIG. 4, the upper portion of the left radiator 29a can be connected to the upper portion of the right radiator 29b through the relay radiator hose 31. The upper portion of the right radiator 29b can be connected to the coolant outlet 5e of the engine 5 through an upper radiator hose 30. As shown in FIG. 2, the lower portion of the left radiator 29a can be connected to the lower portion of the engine 5 through a lower radiator hose 32 (see also FIG. 4). The lower portion of the right radiator 29b can be connected to the lower portion of the engine 5 through a lower radiator hose 33 (see also FIG. 4). In this way, the coolant cooled by the radiator 29 (29a, 29b) can be supplied to various components in the engine 5 by a coolant pump (not shown) in the engine 5 through the lower radiator hoses 32 and 33. The coolant can absorb heat from the engine 5 and reach a high temperature. Then, the high temperature coolant can again supplied to the left and right radiators 29a and 29b through the upper radiator hose 30 and the relay radiator hose 31.

As shown in FIG. 3, a kick pedal 10 can be provided on the right side of the engine 5. When a rider steps onto the kick pedal 10 to start the engine 5, the crankshaft can be rotated.

Circuit Diagram of Electrical System

Figure 6:
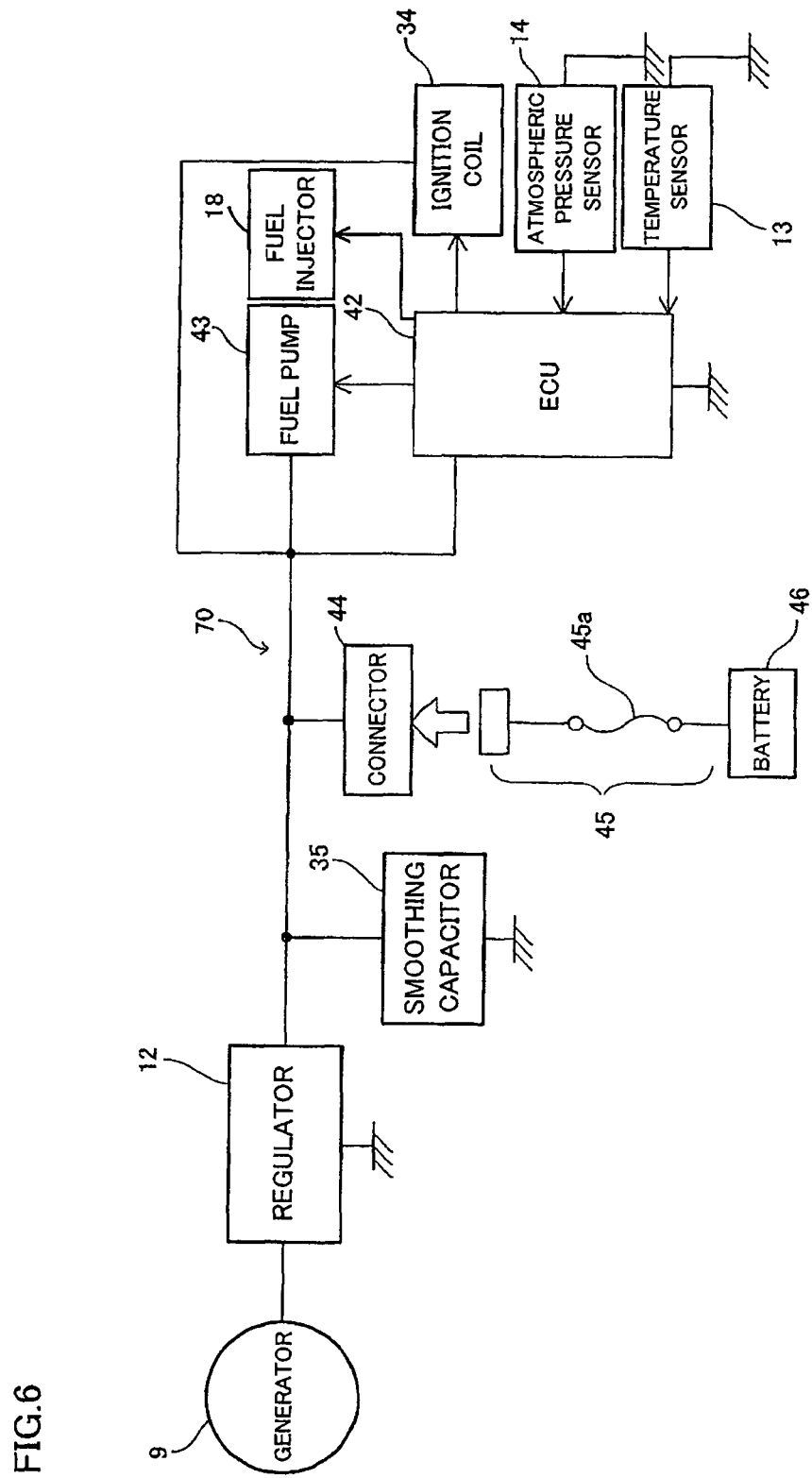
FIG. 6 is a functional block diagram of an electrical system of the motorcycle.

As shown in FIG. 6, the motorcycle 1 can include various kinds of electric equipment, such as a generator 9, a rectifier-regulator 12, a smoothing capacitor 35, a connector 44, a fuel pump 43, a fuel injector 18, an ECU (Engine Control Unit) 42, an ignition coil 34, an atmospheric pressure sensor 14, and a temperature sensor 13. The electrical equipment can be mounted to portions of the frame and/or support members. A battery 46 may be an external battery to be connected to the motorcycle 1 as described in more detail further on. The various kinds of electric equipment can be electrically connected to each other through a harness 70.

The generator 9 can be provided in the crankcase 5a as shown in FIG. 1, for example. The generator 9 can generate power according to the rotation of the crankshaft. The rectifier-regulator 12 can rectify and regulate alternating voltage generated at the generator 9 at a prescribed level, and the prescribed voltage can be supplied to the smoothing capacitor 35, the fuel pump 43, the fuel injector 18, the ECU 42, and the ignition coil 34 through the harness 70. The smoothing capacitor 35 can smooth the voltage supplied from the rectifier-regulator 12. More specifically, the power supplied from the rectifier-regulator 12 can be temporarily accumulated and the accumulated power can be supplied to the fuel pump 43, the ECU 42, the ignition coil 34 and the like.

The fuel pump 43 can pressurize fuel in the fuel tank 22 to have a high pressure level, and supply the fuel to the fuel injector 18. The fuel injector 18 can inject the fuel supplied from the fuel pump 43 into the intake pipe 20. The ignition coil 34 can generate a high voltage necessary for ignition and supply the generated voltage to an ignition plug (not shown) in the engine 5. The atmospheric pressure sensor 14 can detect the atmospheric pressure and supply a signal indicating the detected atmospheric pressure to the ECU 42. The temperature sensor 13 can detect the temperature of the coolant circulating in the engine 5 and supply a signal indicating the detected temperature to the ECU 42. The ECU 42 can electronically control the fuel pump 43, the fuel injector 18, the ignition coil 34 and the like by a well-known method based on information such as the atmospheric pressure detected by the atmospheric pressure sensor 14 and the coolant temperature detected by the temperature sensor 13.

The compensation temperatures of the atmospheric pressure sensor 14 and the temperature sensor 13 may be lower than those of the other kinds of electric equipment. The compensation temperatures of the atmospheric pressure sensor 14 and the temperature sensor 13 may be, for example, 80 degrees Celsius.

Figure 7:
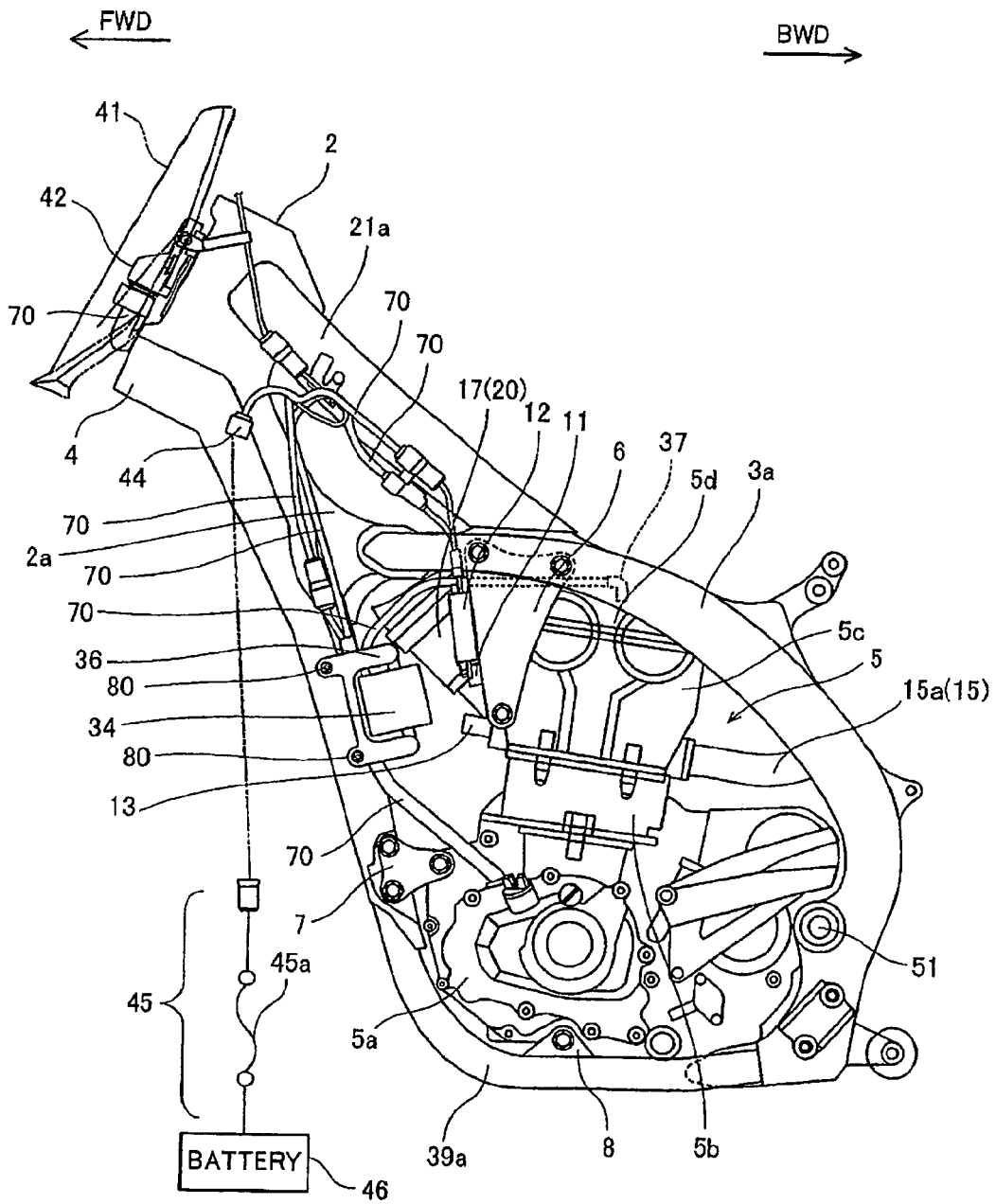
FIG. 7 is a right side view corresponding to FIG. 2, but with the radiator removed.

Referring to FIG. 7, when the motorcycle 1 is manufactured or repaired, the connector 44 can be connected to the external battery 46 through a sub-lead wire 45. In this way, power can be supplied from the battery 46 to the ECU 42, the ignition coil 34, the fuel pump 43, the fuel injector 18 and the like. Therefore, the ECU 42, the ignition coil 34, the fuel pump 43, the fuel injector 18 and the like can be started without starting the engine 5 and generating power using the generator 9.

The sub-lead wire 45 can include a fuse 45a. The fuse 45a can prevent current at a prescribed value or more from coming into the ECU 42 or the like from the battery 46. Advantageously, the fuse 45a can be provided on the side of the sub-lead wire 45 so that if the fuse 45a blows out, it is only necessary to replace the sub-lead wire 45, and the motorcycle 1 does not have to be disassembled/assembled to replace the fuse 45a.

Rectifier-Regulator

As shown in FIG. 2, the rectifier-regulator 12 can be attached to the support member 6. More specifically, the rectifier-regulator 12 can be fixed to the support member 6 through a spacer 11. The spacer 11 can be provided on a side surface of the support member 6 on the forward (FWD) side. Further, the rectifier-regulator 12 can be provided behind the head pipe 2 and the down frame 4, and ahead of the engine 5. Moreover, the rectifier-regulator 12 can provided so as to be substantially flush or aligned with the cylinder head 5c. Traveling airflow can pass through the gap between the left radiator 29a and the down frame 4, and be directed at and reach the rectifier-regulator 12. Therefore, the rectifier-regulator 12 can be cooled by the traveling airflow. In addition, the rectifier-regulator 12 can be partly or entirely covered by the radiator 29a when viewed from the front, so that the rectifier-regulator 12 is at least partly protected from road debris such as mud or the like, splashed up by the front wheel 49.

Figure 8:
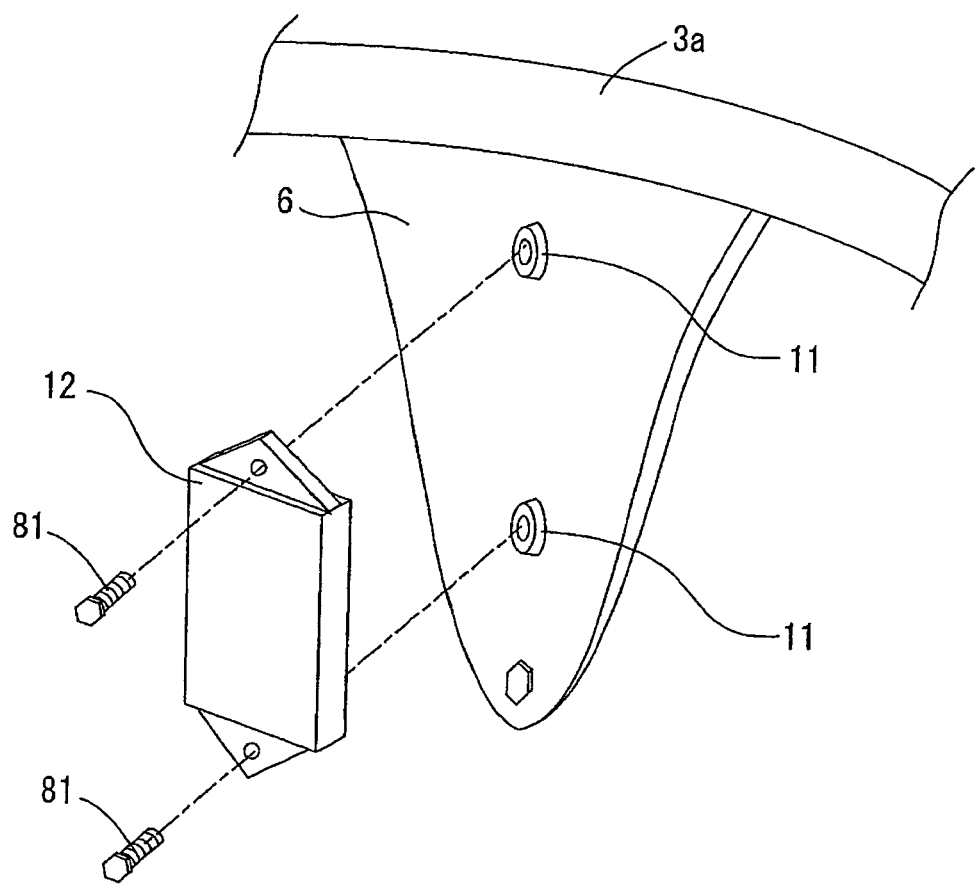
FIG. 8 is an exploded perspective view showing structures for attaching a rectifier-regulator according to embodiments of the invention.

As shown in FIG. 8, the rectifier-regulator 12 can be provided in front of the support member 6 rather than on the side surface of the support member 6 as described above. In the example shown in FIG. 8, a plurality of spacers 11 can be formed at the front surface of the support member 6. The rectifier-regulator 12 can be fixed to the support member 6 by fixing or fastening members, such as bolts 81, applied through openings in the rectifier-regulator 12 to be received in the spacers 11. A gap can be formed between the rectifier-regulator 12 and the support member 6 by the spacers 11, so that traveling airflow is substantially equally received on both the surface of the rectifier-regulator 12 facing outward in FIG. 8, and the opposite surface (the surface adjacent the support member 6). This arrangement advantageously enables the rectifier-regulator 12 to be more effectively cooled.

In alternative embodiments, the rectifier-regulator 12 can be provided at the support member 6 on the right side, as shown in FIG. 3, instead of the support member 6 on the left side as described above.

Temperature Sensor

As shown in FIGS. 3 and 7, the temperature sensor 13 can be attached at the front side of the cylinder head 5c. The tip end (not shown) of the temperature sensor 13 can be exposed in a coolant jacket (not shown) formed in the cylinder head 5c. The temperature sensor 13 can be provided behind the head pipe 2 and the down frame 4. Traveling airflow can pass through the gap between the radiator 29 and the down frame 4, to be directed at and reach the temperature sensor 13. The temperature sensor 13 can be sufficiently cooled by the traveling airflow, so that the temperature of the temperature sensor 13 itself does not easily exceed the compensation temperature. Measurement error is thereby reduced, and therefore the fuel injector 18 can be correctly controlled. In addition, the temperature sensor 13 can be covered by the down frame 4 when viewed from the front, and therefore protected from road debris thrown up by the front wheel 49.

Atmospheric Pressure Sensor

The atmospheric pressure sensor 14 can be provided near a connection portion 2a as shown in FIGS. 3 and 4. More specifically, as viewed in FIGS. 3 and 4, the atmospheric pressure sensor 14 can be provided behind the right main frame 3b, between the right radiator 29b and the down frame 4, behind the head pipe 2 and the down frame 4, and ahead of the engine 5. Traveling airflow can pass through the gap between the radiator 29b and the down frame 4 and be directed at and reach the atmospheric pressure sensor 14. The atmospheric pressure sensor 14 can be sufficiently cooled by the traveling airflow, so that the temperature of the atmospheric pressure sensor 14 does not easily exceed the compensation temperature. Since measurement error can be thereby reduced, the fuel injector 18 can be correctly controlled.

Joint Connector

Figure 9:
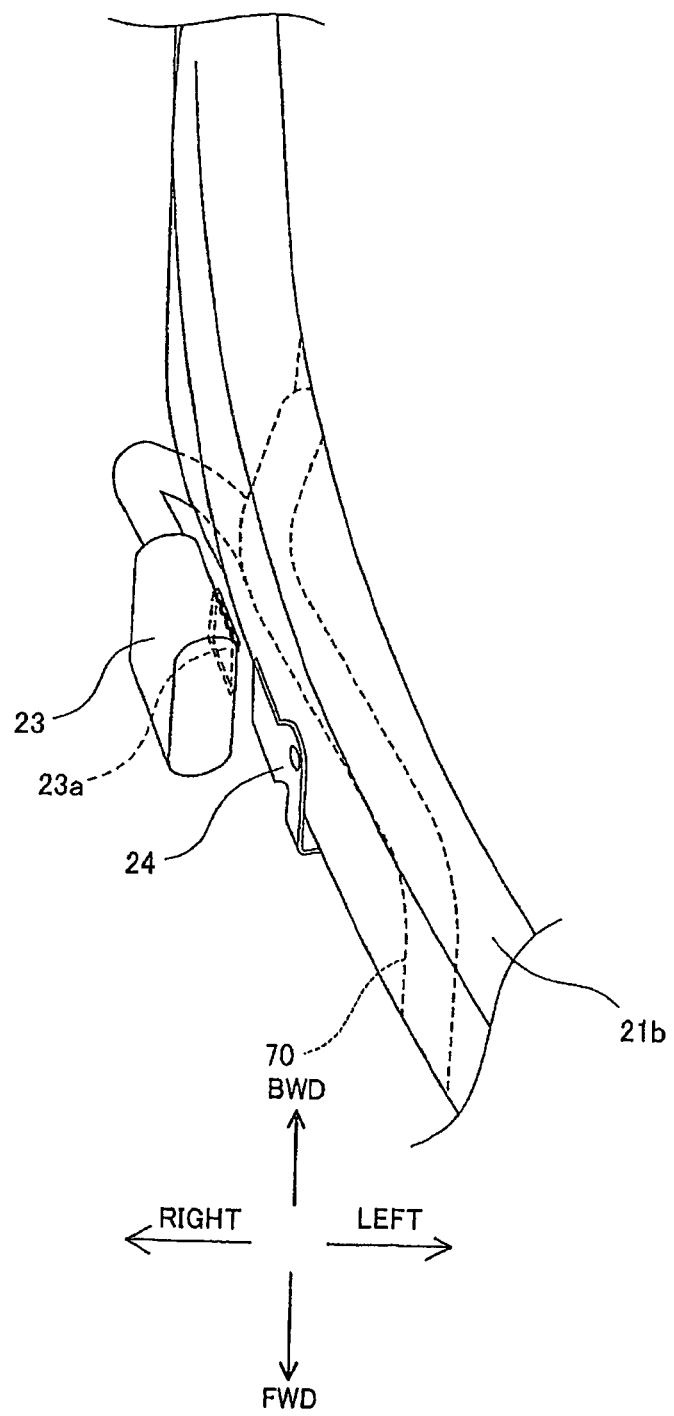
FIG. 9 is a perspective view showing structures for attaching a joint connector according to embodiments of the invention.

As shown in FIGS. 3 and 4, a joint connector 23 used to branch wirings in the harness 70 can provided on the right side (RIGHT) of the right tank frame 21b. FIG. 9 shows further details of the joint connector 23. As shown in FIG. 9, the joint connector 23 can include a pocket 23a formed from a flexible material, such as rubber. A bracket 24 can be attached on the right side of the right tank frame 21b. The bracket 24 can be inserted into the pocket 23a, so that the joint connector 23 is fixed to the right tank frame 21b. The joint connector 23 can be provided behind the head pipe 2 and ahead of the engine 5.

Ignition Coil

Figure 10:
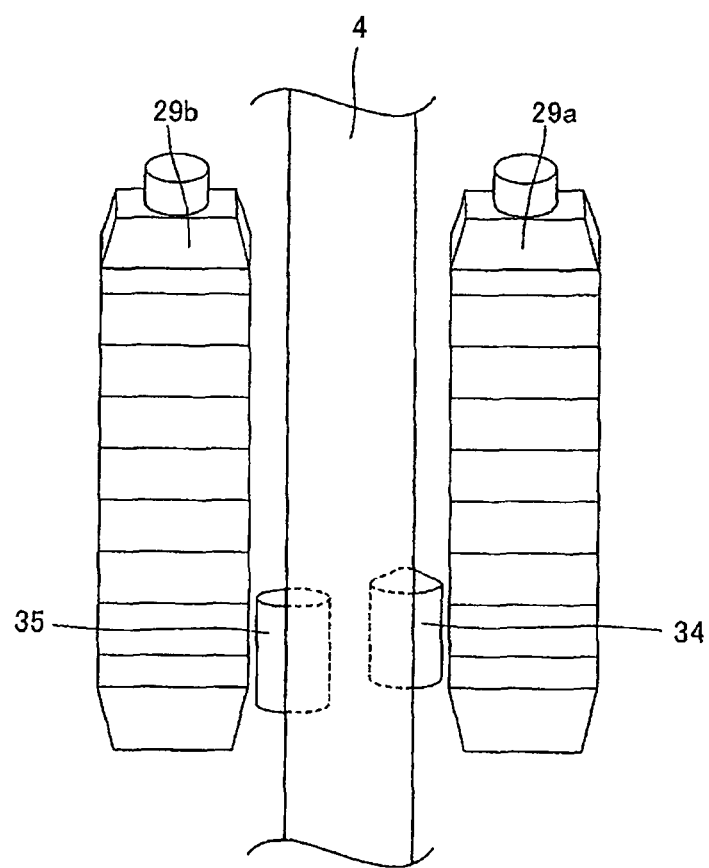
FIG. 10 is a front view of the radiator and the down frame.

As shown in FIGS. 1, 2, 4 and 7, the ignition coil 34 can be mounted or attached to the back side of the down frame 4 by a support member 36. The ignition coil 34 can be positioned so as to be substantially flush or aligned with the cylinder head 5c, behind the head pipe 2 and ahead of the engine 5. As shown in FIG. 4, the ignition coil 34 can be electrically connected with a plug gap 37 through the harness 70. As shown in FIG. 10, the ignition coil 34 can have a portion that can be visible from the front through the gap between the down frame 4 and the left radiator 29a.

Figure 11:
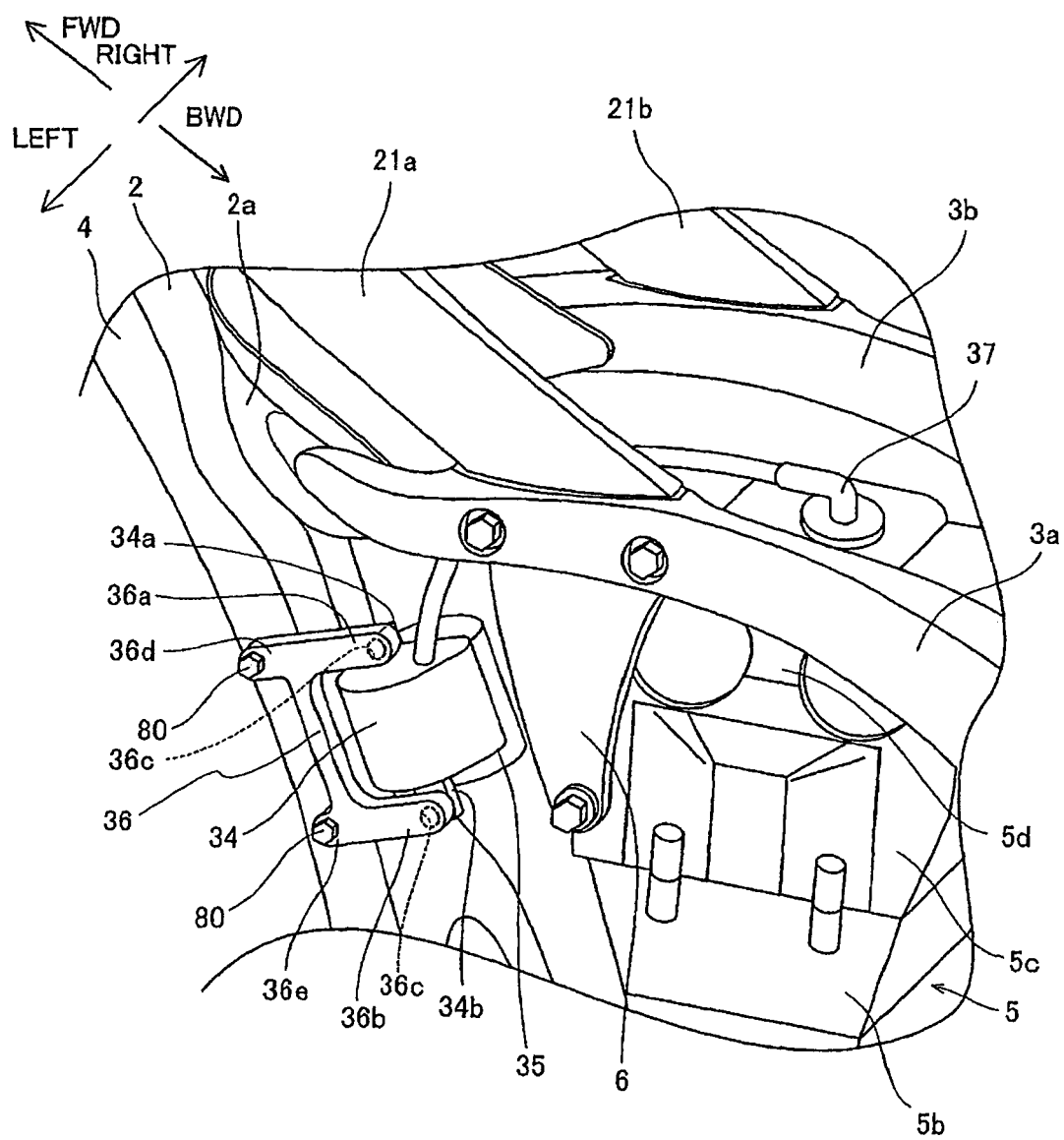
FIG. 11 is a perspective view of an ignition coil and associated peripheral structures, according to embodiments of the invention.
Figure 12:
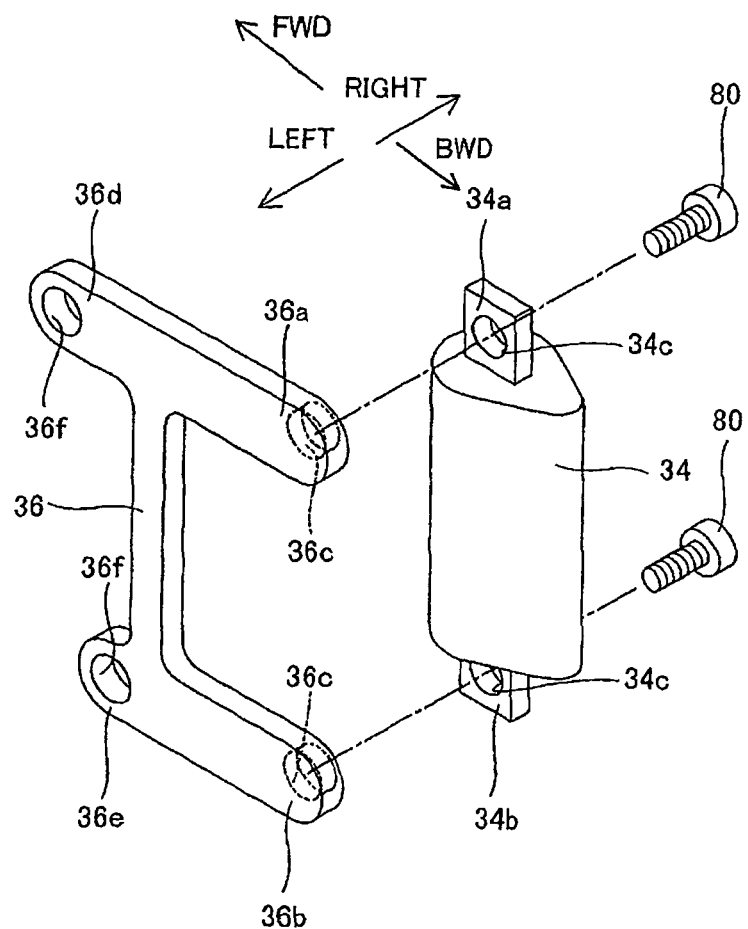
FIG. 12 is an exploded perspective view showing structures for attaching the ignition coil.

As shown in FIGS. 11 and 12, the ignition coil 34 can have a coat of a coating material, such as resin. The ignition coil 34 can have a substantially cylindrical shape having a more prominent lobe portion. Thus, for example, in a cross-section thereof, the ignition coil 34 can have a rounded triangular shape. When in position on the motorcycle 1, the ignition coil 34 can be oriented so that a thickness thereof in the widthwise direction (RIGHT, LEFT) of the motorcycle 1 is gradually reduced toward the backside (BWD) of the motorcycle 1. As shown in FIG. 12, the upper and lower surfaces of the ignition coil 34 can be provided with attachment portions 34a and 34b, respectively. More specifically, a part of the coating material can extend upward from the upper surface to form the attachment portion 34a, and a part of the coating material can extend downward from the lower surface to form the attachment portion 34b. An opening, such as a screw insert hole 34c, can be formed through each of the attachment portions 34a and 34b.

The support member 36 can be substantially H-shaped. A recess, referred to herein as a "non-through screw hole 36c," can be formed in each of inner surfaces (the surfaces on the side of RIGHT in the figure) of ends 36a and 36b of the support member 36. The screw holes 36c can correspond respectively to the screw insert holes 34c of the ignition coil 34. A fixing or fastening member, such as a bolt 80, can pass through each screw insert hole 34c and be received in (e.g., screwed to) each screw hole 36c. In this way, the ignition coil 34 can be fixed to the support member 36.

Further, through openings, such as screw insert holes 36f, can be formed through each of ends 36d and 36e of the support member 36. As shown in FIG. 11, a bolt 80 can be inserted through each screw insert hole 36f and fastened at, e.g., screwed to, the left side surface (the surface on the side of LEFT in the figure) of the down frame 4. In this way, the ignition coil 34 can be attached to the down frame 4.

Smoothing Capacitor

Figure 13:
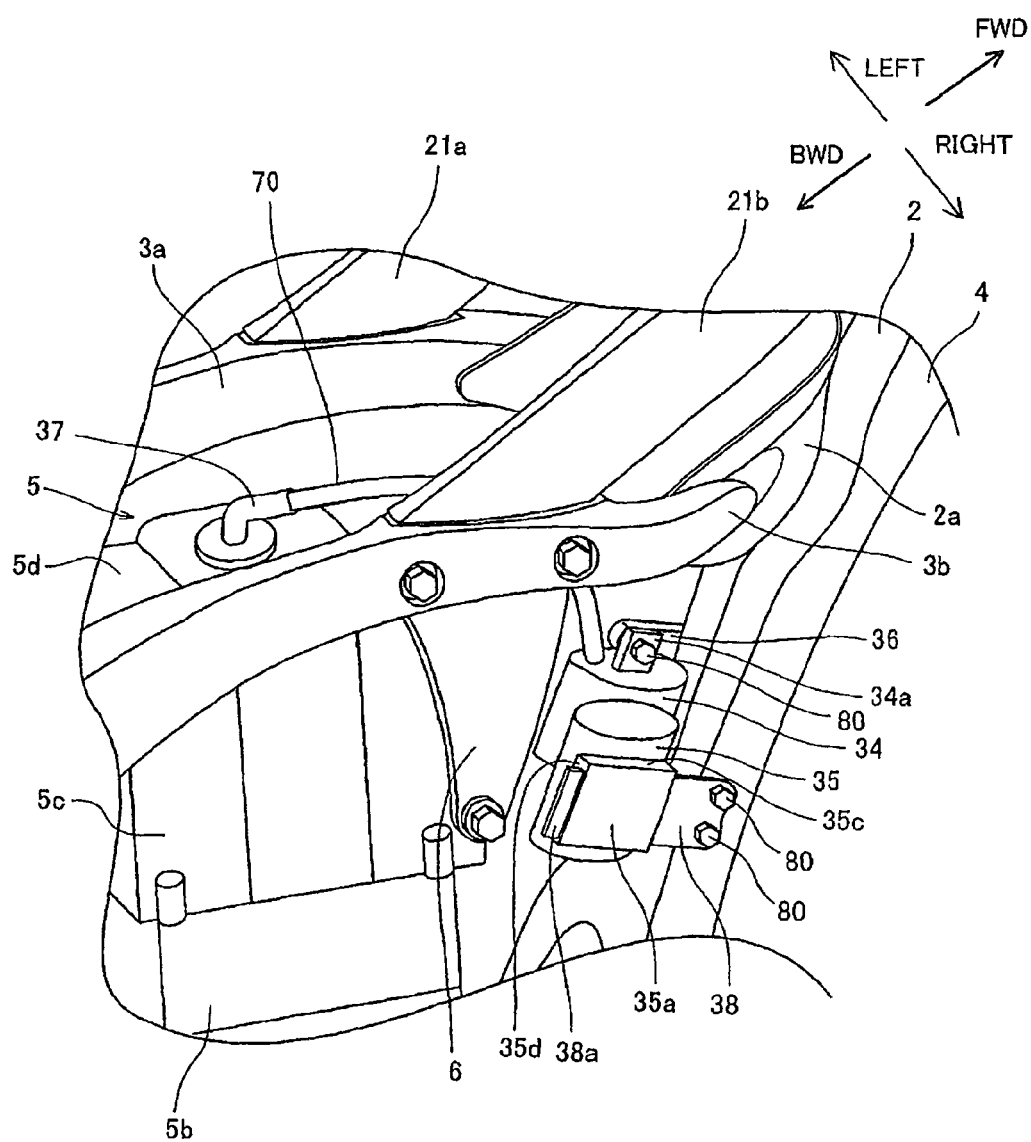
FIG. 13 is a perspective view of a smoothing capacitor and associated peripheral structures, according to embodiments of the invention.

As shown in FIGS. 3, 4, and 13, the smoothing capacitor 35 can be mounted to or attached to the back side of the down frame 4 by a support member 38. The smoothing capacitor 35 can be provided so as to be substantially flush or aligned with the cylinder head 5c, behind the head pipe 2 and ahead of the engine 5.

Figure 14:
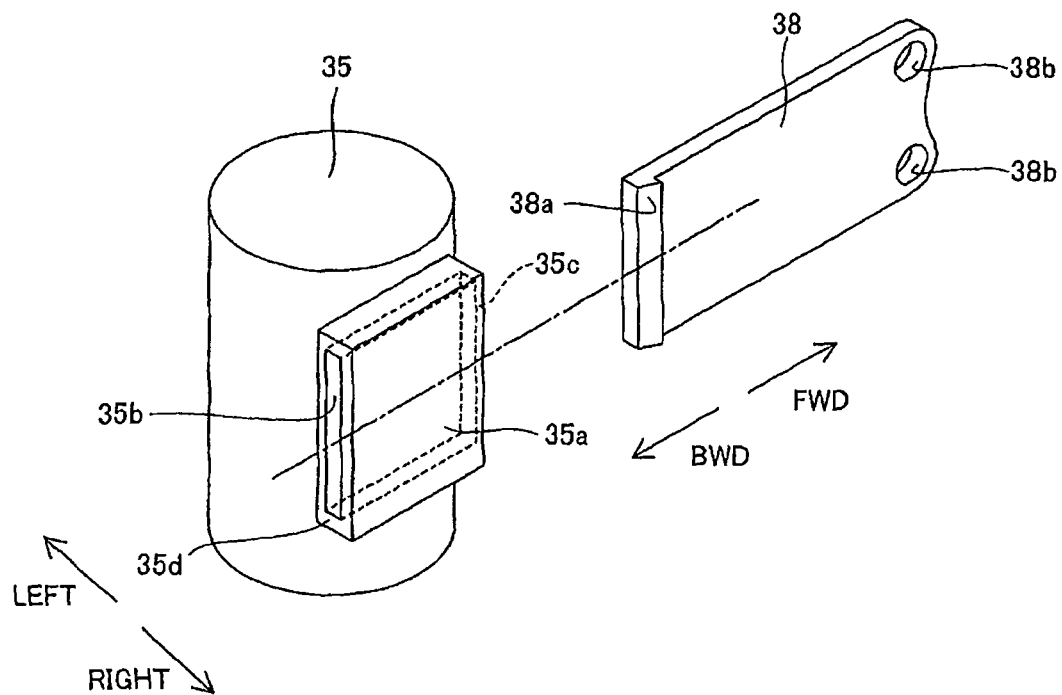
FIG. 14 is an exploded perspective view showing structures for attaching the capacitor.

As shown in FIGS. 13 and 14, the smoothing capacitor 35 can have a coat of material, such as resin. The smoothing capacitor 35 can have an approximately or substantially cylindrical shape. An attachment portion 35a formed, for example, from a flexible material such as rubber, can be provided at a side surface of the smoothing capacitor 35. The attachment portion 35a can have an opening, such as a through insert hole 35b, a front surface 35c having one end of the insert hole 35b formed therein, and a back surface 35d having the other end of the insert hole 35b formed therein. The insert hole 35b can extend in the lengthwise direction (FWD, BWD) of the vehicle.

The support member 38 can include a hook portion 38a and multiple openings, such as two screw insert holes 38b, formed therein. The hook portion 38a can be formed at the tip end of the support member 38. The screw insert holes 38b can be formed at the rear end of the support member 38.

The support member 38 can be inserted into the insert hole 35b of the attachment portion 35a. When the support member 38 is inserted, the hook portion 38a can be hooked on the back surface 35d of the attachment portion 35a. In this way, the smoothing capacitor 35 can be secured by the support member 38.

The support member 38 can be attached at the right side surface (the surface on the side of RIGHT in the figure) of the down frame 4. For example, bolts 80 can be applied to the screw insert holes 38b to fasten, e.g., screw, the support member 38 to the down frame 4.

As shown in FIG. 10, from the front the ignition coil 34 and the smoothing capacitor 35 can be partly exposed and visible through the gap between the down frame 4 and the radiators 29a and 29b. Therefore, traveling airflow passing through the gap can be directed at and reach the ignition coil 34 and the smoothing capacitor 35. Accordingly, the ignition coil 34 and the smoothing capacitor 35 can be sufficiently cooled by the traveling airflow, so that the temperatures of the ignition coil 34 and the smoothing capacitor 35 do not easily exceed their compensation temperatures. In addition, the other portions of the ignition coil 34 and the smoothing capacitor 35 can be covered by the down frame 4 in the front view, and therefore be protected from road debris. Moreover, hot airflow discharged backward from the radiators 29a and 29b can be prevented from directly reaching the ignition coil 34 and the smoothing capacitor 35, further enabling the ignition coil 34 and the smoothing capacitor 35 to be sufficiently cooled.

Connector

As shown in FIG. 7, the connector 44 can be provided at the upper portion of the left side surface of the down frame 4. The connector 44 can be provided behind the head pipe 2 and ahead of the engine 5. The connector 44 can be used to temporarily receive externally applied power as described above; in a normal operating condition, no element is connected to the connector.

ECU

As shown in FIGS. 2, 3, and 7, the ECU 42 can be provided in front of the head pipe 2, and covered with the number plate 41 to protect the ECU 42 from road debris. More specifically, the ECU 42 can be provided between the number plate 41 and the head pipe 2. The harness 70 can be connected to the lower part of the ECU 42.

Advantages

The above-described structures provide a number of advantages. For example, because electric equipment such as the rectifier-regulator 12, the temperature sensor 13, the atmospheric pressure sensor 14, the ignition coil 34, the smoothing capacitor 35, the joint connector 23, and the connector 44 are provided behind the head pipe 2 and ahead of the engine 5, traveling airflow can be directed at the electric equipment to sufficiently cool the equipment. In addition, because the exhaust pipe 15 is provided behind the engine 5, heat damage to the electric equipment from heat emitted from the exhaust pipe 15 can be prevented.

As another example, because the electric equipment can be provided together behind the head pipe 2 and ahead of the engine 5, the harness 70 connected between the electric equipment and the ECU 42 can have a reduced length. Moreover, when the motorcycle 1 is disassembled for repairing and/or diagnostics, the electric equipment can be removed as a whole, so that the harness 70 can be protected against disconnection or damages.

Moreover, because the electric equipment such as the rectifier-regulator 12, the ignition coil 34, and the smoothing capacitor 35 can provided so as to be substantially flush or aligned with the cylinder head 5c, the electric equipment can be protected from road debris.

Alternative Embodiments

While the above description has referred to an off-road type vehicle as one illustrative example, embodiments of the invention are not limited to any particular type of vehicle. For example, the motorcycle 1 may be an on-road type vehicle. Alternatively, the vehicle may an ATV (All Terrain Vehicle) such as a three-wheel buggy or a four-wheel buggy, or other kind of vehicle.

In alternative embodiments, the position of the ECU 42 can change, for example. While in the above description, the ECU 42 can be provided ahead of the head pipe 2, the ECU 42 can alternatively be provided behind the head pipe 2 and ahead of the engine 5. A part of the ECU 42 can be covered by the down frame 4, and the other part can be seen through the gap between the down frame 4 and the radiator 29. The ECU 42 can be provided so as to be flush with the cylinder head 5c.

Further, the above has described an external battery 46. In alternative embodiments, the motorcycle 1 can include a battery. In this case, the battery can be provided behind the head pipe 2 and ahead of the engine 5, for example. A portion of the battery can be covered by the down frame and the other portion can be seen through the gap between the down frame 4 and the radiator 29. The battery can be provided so as to be flush with the cylinder head 5c.

Still further, according to the above description, the engine 5 can be inclined backward. Alternatively, the engine 5 can be inclined forward or stand upright.

Additionally, according to the above description, the support member 36 for the ignition coil 34 and the support member 38 for the smoothing capacitor 35 can be screwed to the down frame 4 by the bolts 80. Alternatively, the support members 36 and 38 can be welded to the down frame 4.

Moreover, as described above, the connector 44 can be provided on the left side surface of the down frame 4. Alternatively, the connector 44 can be provided anywhere, as long as its position is behind the head pipe 2 and ahead of the engine 5.

In still further alternative embodiments, electric equipment other than the above-described electric equipment, such as an ABS (Antilock Brake System) can be provided behind the head pipe 2 and ahead of the engine 5.

It will be apparent to one skilled in the art that the manner of making and using the claimed invention has been adequately disclosed in the above-written description of the preferred embodiments taken together with the drawings.

It will be understood that the above description of the preferred embodiments of the present invention are susceptible to various modifications, changes and adaptations, and the same are intended to be comprehended within the meaning and range of equivalents of the appended claims.

What is claimed is:

1. A vehicle, comprising:
a head pipe;
an engine provided behind the head pipe;
an intake pipe connected to a front side of the engine and provided ahead of the engine;
an exhaust pipe connected to a back side of the engine and provided behind the engine;
electric equipment provided behind the head pipe and ahead of the engine;
a main frame extending backward from the head pipe;
a support member attached to the main frame, the engine being supported by the support member; and
the electronic equipment rectifier-regulator attached to the support member;
wherein one or more spacers form a gap between the rectifier-regulator and the support member.

2. The vehicle according to claim 1, further comprising:
a down frame arranged to extend downward from the head pipe;
the electric equipment being provided at a back side of the down frame.

3. The vehicle according to claim 2, wherein
when viewed from a front of the vehicle, the electric equipment is arranged to have a visible portion, and another portion covered by the down frame.

4. The vehicle according to claim 3, further comprising:
a radiator to cool coolant circulating in the engine, the radiator including
a left radiator provided on a left side with respect to a front of the down frame; and
a right radiator provided on a right side with respect to the front of the down frame;
the electric equipment, when viewed from the front of the vehicle, having a portion exposed by a gap between the down frame and at least one of the left or right radiator, and the other portion covered by the down frame.

5. The vehicle according to claim 4, further comprising:
a left mudguard extending obliquely to a left side with respect to a front surface of the left radiator from a vicinity of an inner edge of the left radiator; and
a right mudguard extending obliquely to a right side with respect to a front surface of the right radiator from a vicinity of an inner edge of the right radiator.

6. The vehicle according to claim 1, wherein
the electric equipment comprises an atmospheric pressure sensor to detect atmospheric pressure;
the vehicle further comprising
a fuel injector to inject fuel into the intake pipe; and
an engine control unit arranged to control the fuel injector based on the atmospheric pressure detected by the atmospheric pressure sensor.

7. The vehicle according to claim 1, further comprising:
a radiator to cool coolant circulating in the engine;
the electric equipment including a temperature sensor provided on the front side of the engine to detect temperature of the coolant;
the vehicle further comprising
a fuel injector to inject fuel into the intake pipe; and
an engine control unit to control the fuel injector based on the temperature detected by the temperature sensor.

8. The vehicle according to claim 7, wherein:
the engine comprises a cylinder head; and
the temperature sensor is attached at a front side of the cylinder head.

9. The vehicle according to claim 1, further comprising:
a generator configured to generate power by a driving force of the engine;
wherein the rectifier-regulator is configured to rectify and regulate alternating voltage supplied from the generator at a prescribed level.

10. The vehicle according to claim 1, wherein the engine comprises a cylinder head, and the electric equipment is substantially flush with the cylinder head.

11. A vehicle, comprising:
a down frame;
a left radiator and a right radiator; and
a plurality of electrical components;
wherein, in a front view of the vehicle, at least a portion of the electrical components is exposed in a gap between at least one of the left radiator and the right radiator and the down frame;
wherein the plurality of electrical components includes an ignition component having a portion that is exposed; and
wherein the ignition component is an ignition coil that is attached to the down frame via a substantially H-shaped support member having inner surfaces configured to receive the ignition coil.

12. The vehicle of claim 11, further comprising:
a head pipe; and
an engine;
wherein at least a portion of the electrical components are located between the head pipe and the engine.

13. The vehicle of claim 11, wherein the plurality of electrical components includes a connector for an external battery.

14. The vehicle of claim 11, further comprising:
a head pipe;
a cover plate; and
an engine control unit located between the cover plate and the head pipe.

15. A motorcycle, comprising:
a frame;
an engine mounted to the frame;
a head pipe; and
electrical equipment mounted to the frame between the head pipe and the engine so as to be at least partly exposed in a front view of the motorcycle;
wherein the electrical equipment includes an ignition component mounted on one side of a downwardly-extending portion of the frame;
wherein the electrical equipment further includes a capacitor component mounted on another side of the downwardly-extending portion of the frame; and
wherein a flexible portion is provided on the side of the capacitor component, the flexible component having a recess configured to receive a support member of the frame.

* * * * *